United States Patent [19]
Buchholz

[11] Patent Number: 5,262,884
[45] Date of Patent: Nov. 16, 1993

[54] OPTICAL MICROPHONE WITH VIBRATING OPTICAL ELEMENT

[75] Inventor: Jeffrey C. Buchholz, Cross Plains, Wis.

[73] Assignee: Micro-Optics Technologies, Inc., Middleton, Wis.

[21] Appl. No.: 773,248

[22] Filed: Oct. 9, 1991

[51] Int. Cl.⁵ .................... H04B 10/02; H04B 10/12
[52] U.S. Cl. ................... 359/151; 359/150; 359/173; 381/172
[58] Field of Search ............. 359/149, 150, 151, 173; 381/172; 367/140, 150

[56] References Cited

U.S. PATENT DOCUMENTS

| | | | |
|---|---|---|---|
| 3,286,032 | 11/1966 | Baum | 359/150 |
| 3,622,791 | 11/1971 | Bernard | 250/231.19 |
| 4,166,932 | 9/1979 | Selway | 381/172 |
| 4,412,105 | 10/1983 | Muscatell | 359/149 |
| 4,422,182 | 12/1983 | Kenjyo | 359/150 |
| 4,479,265 | 10/1984 | Muscatell | 359/151 |
| 4,482,805 | 11/1984 | Palmer | 367/140 |
| 4,640,382 | 2/1987 | Hartmann et al. | 181/175 |

FOREIGN PATENT DOCUMENTS

| | | | |
|---|---|---|---|
| 2639822 | 12/1977 | Fed. Rep. of Germany | 359/151 |
| 41055 | 3/1980 | Japan . | |
| 0075041 | 5/1982 | Japan | 359/151 |
| 0096499 | 6/1983 | Japan | 381/172 |
| 0231500 | 9/1989 | Japan | 381/172 |
| 0251842 | 10/1989 | Japan | 359/150 |
| 0190099 | 7/1990 | Japan | 381/172 |
| 1576706 | 10/1980 | United Kingdom | 359/150 |

*Primary Examiner*—Richard E. Chilcot, Jr.
*Assistant Examiner*—Kinfe-Michael Negash
*Attorney, Agent, or Firm*—Ross & Stevens

[57] ABSTRACT

An optical microphone includes a vibrating membrane defining a diaphragm for receiving acoustic signals. An optical element such as a lens is attached for vibrating with the membrane in direct relationship with the acoustic input signals. Fixed fiber optic cables may be placed in alignment with the lens for directing the initial light toward the lens and transmit the directed light from the lens. A single or dual fiber optic geometry may be used with the vibrating lens.

27 Claims, 2 Drawing Sheets

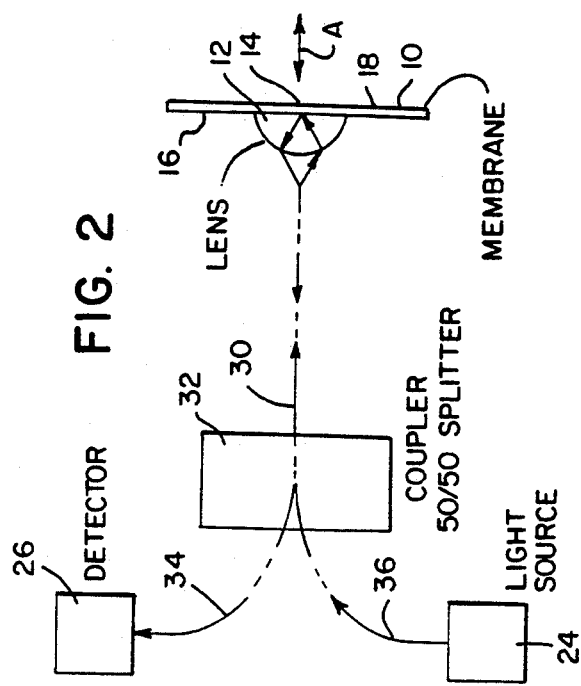
FIG. 1
FIG. 2
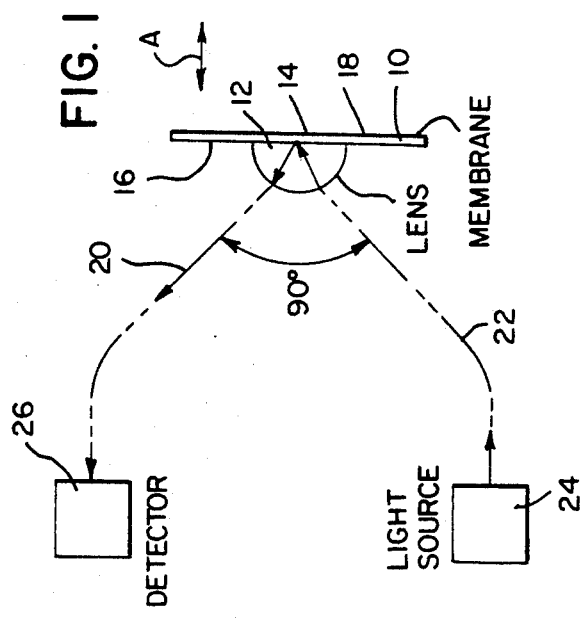
FIG. 3
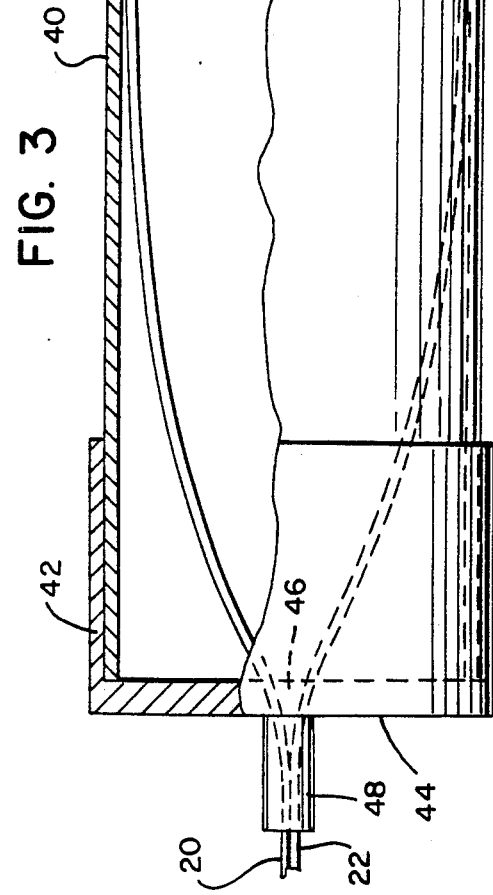

OPTICAL MICROPHONE WITH VIBRATING OPTICAL ELEMENT

BACKGROUND OF THE INVENTION

1. Field of the Invention

The subject invention is generally related to optical microphones and is specifically directed to a microphone having an optic element mounted for movement with the vibrating membrane of the microphone.

2. Description of the Prior Art

Conventional microphones, electro-acoustical transducers, are frequently used in electrically hostile environments. The output of the microphone is an electrical signal which can be distorted or interrupted by any electromagnetic interference, electromagnetic pulse or radio frequency interference. Since this output can be as low as several microvolts for some microphones subject to quiet or conversational level speech, the signal must be amplified near the source or the signal carrying wire must be adequately shielded to minimize distortion or interruption of the signal. These precautions are not always adequate, yet greatly increase the cost of the transducer system and add to the difficulty of manufacture and assembly.

More recently, fiber optic microphones have been developed, utilizing a fiber optic cable to carry the signal from the transducer to the amplifier. Fiber optic microphones are not dependent on electrical signals for voice transmission and provide for an electro-acoustical transducer with a minimum of distortion or interruption caused by electromagnetic interference, electromagnetic pulse or radio frequency interference. The light signal carried by the fiber optic cable is unaffected by electric or magnetic fields. It can be transmitted long distances without attenuation of the signal and without the need of added shielding. An example of an optical microphone is disclosed in Japanese Patent Application No. 0,041,055 by T. Nishida, filed in Japan on Sep. 18, 1978. The Nishida patent discloses a non-inductive microphone utilizing a vibrating membrane, a flexible fiber optic cable and a fixed lens mounted between the cable and the membrane.

U.S. Pat. No. 4,479,625 entitled "LASER MICROPHONE", issued to R. Muscatell on Oct. 23, 1984 discloses a laser microphone wherein two aligned beams of laser light are modulated by vibrations of a low mass reflecting body. The lenses are in a fixed position.

U.S. Pat. No. 3,622,791 entitled "MICROPHONE CIRCUIT FOR DIRECT CONVERSION OF SOUND SIGNALS INTO PULSE MODULATED ELECTRIC SIGNALS" issued to P. Bernard on Nov. 23, 1971 discloses a microphone for converting sound vibrations into electrical pulses by using a small mirror connected to the diaphragm. The oscillation of the mirror under the influence of speech will modify the optical path of directed light beams.

U.S. Pat. No. 4,640,382 entitled "ACOUSTIC FRICTIONAL RESISTANCE CONSTRUCTION AND METHOD OF PRODUCING AN ACOUSTIC FRICTIONAL RESISTANCE USING A LASER" issued to H. Hartmann on Feb. 3, 1987 discloses an electro-acoustic transducer which utilizes a laser to produce a light beam. The beam is reflected off of a mirror and then focused by a fixed lens.

SUMMARY OF THE INVENTION

The subject invention is directed to a fiber optic microphone using a vibrating membrane that deflects under acoustic pressure in the same manner as ordinary electric microphones, such as by way of example, dynamic microphones or electric condenser microphones. The attached wire coil or capacitor plate, such as that used in a dynamic or condenser microphone to generate an electric signal, has been replaced with a small refractive or diffractive optical element, such as by way of example, a lens attached directly to the membrane at an optimum location. The motion of the lens as the membrane vibrates under the acoustic input causes the amount of light collected by a fiber optic cable to vary in direct relationship with the variation of the acoustic signal and in proportion to the strength of the acoustic signal. The initial light beam is directed onto the lens and the fiber optic cable is illuminated in the standard manner by a light emitting diode or the like.

In one embodiment of the invention, a dual fiber optic cable geometry is utilized, wherein the initial light beam is directed onto the lens via a first cable and the emitting redirected light beam is transmitted from the lens via second fiber optic cable. In a second embodiment of the invention, a single fiber optic cable may be used in combination with the coupler/splitter, wherein the initial light beam and emitted light beam are transmitted via a single cable geometry.

The membrane used with the microphone is similar to those used in standard dynamic and/or condenser microphones. As with those types of microphones, the membrane properties and the acoustic cavity largely determine the frequency response and the sensitivity of the microphone. The lens or other optical element which is placed directly on the membrane provides a microphone with a sensitivity and depth of modulation substantially greater than those obtained by a microphone utilizing a fixed lens design. A lens may be made by placing a drop of optical epoxy directly on the membrane. The size of the drop may be selected to provide a lens with a focal length matched to the positioning of the optical fibers to give the best modulation of the collected light signal for membrane motions caused by the acoustic pressure. Fiber positioning is based on standard techniques well within the understanding of those who are ordinarily skilled in the art.

A microphone constructed in accordance with the subject invention is well suited for use as a digital microphone. The light beam from the light source can be readily modulated on and off to provide a sampling of the acoustic wave form. This gated signal can then be digitized with an analogue to digital converter. This differs from standard digital audio recording wherein a sample of an analogue electrical signal is first created at a desired sampling frequency and then digitized. In the digital microphone implementation, the sampling of the signal comes from the gating of the optical beam from the initial light source.

The prototype construction of the microphone includes an elongate, cylindrical microphone body having a closure cap at one end, through which the fiber optic cables pass to be connected to a light source and a detector. The fiber optic cables are directed over a glass prism having a conical prism end with an angle intersecting the axis of the body in such a manner as to direct the fiber optic cables toward the optical axis of the lens. A metalized membrane is stretched over the acoustical input opening and the epoxy lens is placed on the membrane at the optimum position, preferably the geometric center of the opening covered by the membrane. One surface of the membrane may be covered with a reflective coating. Acoustical pressure waves directed against the membrane cause the membrane and lens to vibrate, altering the collected light beam signals which have been directed on the lens by the fiber optic cable carrying the initial light source. The light is then transmitted via the second fiber optic cable to a detector, where it is converted into an electrical signal.

It is an object and feature of the subject invention to provide an optical microphone having a minimum of distortion caused by magnetic, electrical or radio interference.

It is another object and feature of the subject invention to provide an optical microphone wherein the lens for receiving and transmitting light to and from the fiber optic cable is secured on and vibrates with the diaphragm or membrane of the microphone.

It is yet another object and feature of the subject invention to provide an optical microphone wherein the transmitted signals can be transmitted a substantial distance in a fiber optic cable, minimizing the attenuation and distortion generally experienced with electro-acoustic transducers.

Other objects and features of the invention will be readily apparent from the accompanying drawings and detailed description of the preferred embodiment.

BRIEF DESCRIPTION OF THE DRAWINGS

FIG. 1 is a diagrammatic illustration of a microphone in accordance with the subject invention and having a dual fiber geometry.

FIG. 2 is a diagrammatic illustration of a micro phone in accordance with the subject invention and having a single fiber geometry.

FIG. 3 is an elevational view, partially in section, of a microphone made in accordance with the diagram of FIG. 1.

DETAILED DESCRIPTION OF THE PREFERRED EMBODIMENT

Figure 4:
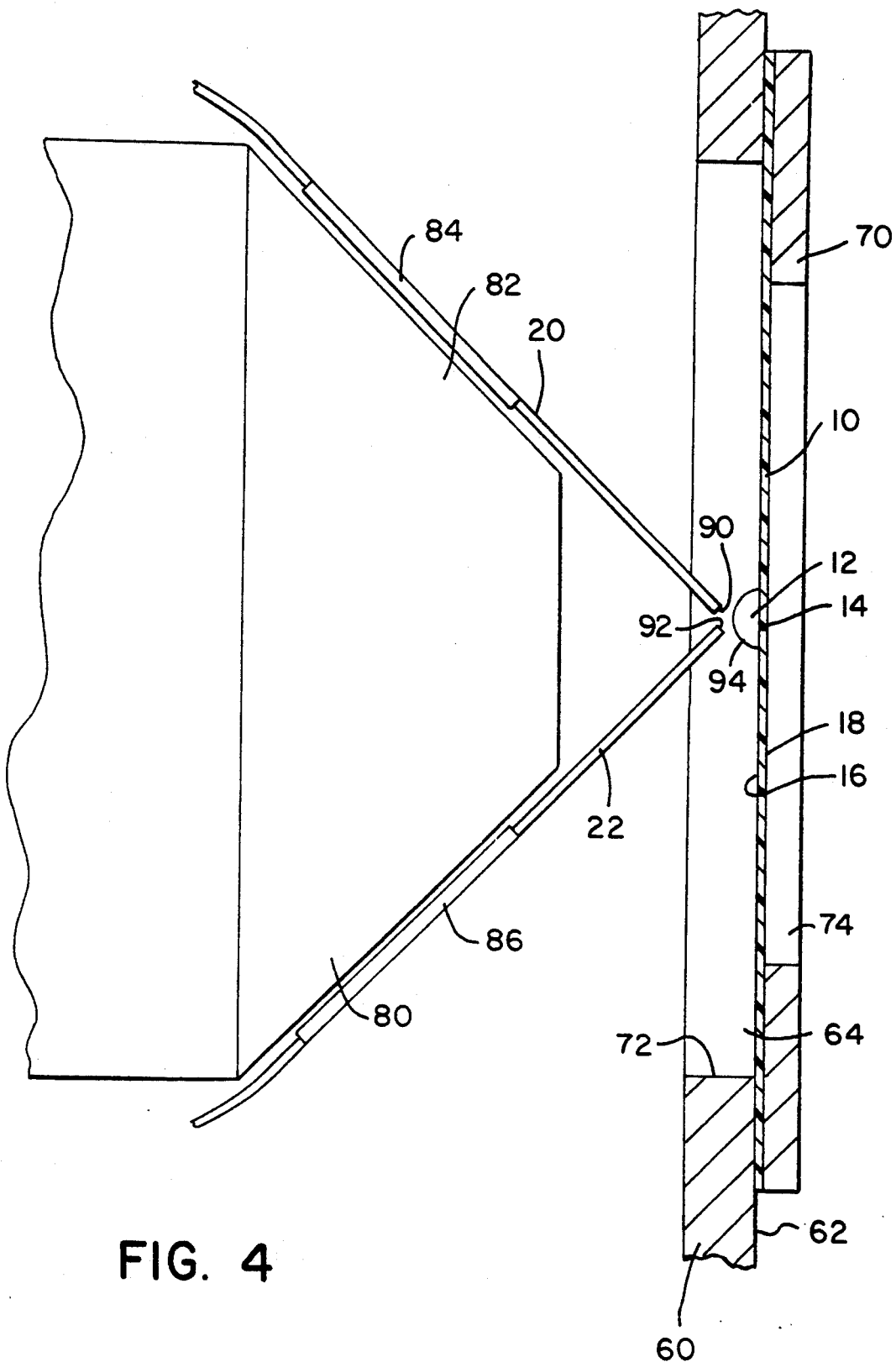
FIG. 4 is an enlarged fragmentary view looking in the same direction as FIG. 3.

The subject invention utilizes a flexible membrane that is adapted to deflect under acoustic pressure signals in the same manner as ordinary electric microphones such as dynamic microphones or condenser microphones. As shown in FIG. 1, the membrane 10 includes a small convex lens 12 attached to the membrane at its geometric center 14. In the preferred embodiment the lens is placed on the inside surface 16 of the membrane. It will be understood that the optimum position and placement of the lens is dictated by the specific application and desired response. One surface 16 of the membrane is generally a reflective surface. However, certain optical element designs are capable of functioning in accordance with the invention without use of a reflective membrane. As with dynamic microphones, the membrane 10 vibrates under acoustic input signals introduced and directed toward the outer surface 18 of the membrane, causing the membrane and lens to vibrate back and forth in the directions of arrow A. This motion causes the lens to move back and forth with the vibrating membrane, varying the amount of light collected by the fiber optic cable diagrammatically illustrated at 20. The light intensity varies at the acoustic signal frequency and is proportional to the strength of the acoustic signal because of the motion of the membrane. That is, there is a direct relationship between movement of the lens and the vibration of the membrane in response to the receipt of acoustic signals directed onto the surface 18 of the membrane.

In the embodiment of FIG. 1, the initial light beam is directed to the lens on membrane by a second fiber optic cable as is diagrammatically illustrated and designated as 22. The light source 24 comprises a light-emitting diode or similar light source, as is well known to those who are skilled in the art. The nature of the light source is not important as long as it provides enough light intensity at a wave length suitable for the fibers, lens and light detector used. The light source is directed through the lens and onto the surface 16 of the membrane, at the geometric center 14 or point of maximum vibration. The reflected light is carried to the light detector 26 via the fiber optic cable 20.

The membrane and lens configuration of the microphone can also be used with a single fiber optic configuration, as is shown in FIG. 2. In the microphone geometry of FIG. 2, a single fiber optic cable 30 is used to direct the emitted light source toward the lens 12, and to receive the redirected light from the lens 12 and transmit the signals to and from a splitter-coupler 32. The coupler 32 operates in the well known manner to split the signal on cable 30 into a bidirectional light path, wherein the cable both transmits light to the lens 12 from the light source 24 and receives the collected light from the lens 12 and transmits it through the splitter 30 to the detector 26. Independent fiber optic cables 34 and 36 couple the detector and the light source, respectively, with the splitter 32.

The two fiber geometry of FIG. 1 gives better depth of modulation because of the absence of an unmodulated light from the splitter. The single fiber geometry of FIG. 2 may be preferable where space requirements in the microphone head and certain cost considerations must be taken into account. However, either configuration takes advantage of the unique lens geometry of the subject invention, wherein the optical element such as lens 12 is mounted for vibration with the membrane 10 and vibrates in response to the acoustic waves directed toward the surface 18 of the membrane.

A microphone made in accordance with the teachings of the subject invention and following the dual fiber optic geometry of FIG. 1 is illustrated in FIGS. 3 and 4. As there shown, the microphone includes an inner, hollow cylindrical case 40 having opposite open ends and adapted for housing the microphone structure. One end of the case includes a cap or closure 42 which may be threadably secured to the case or otherwise suitably mounted. The end wall 44 of the cap includes a through aperture, as indicated at 46, through which the fiber optic cables 20 and 22 pass. A flexible sleeve or coupling 48 may be attached to the end wall 44 of the cap in axial alignment with the aperture 46 for aligning the cables 20 and 22 and for assuring that they are not damaged by over stressing cables through bending and the like against the rigid side walls of the aperture 46 of the cap.

The opposite end of the microphone includes an outer case 50 which also may be threadably secured to or otherwise suitably connected to the inner case 40. The outer case 50 has an open end 52 which extends out beyond the open end 54 of the inner case and includes a first plate or washer 60 secured thereto and having a flat, smooth, planar outer surface 62. A central opening 64 is provided in the plate 60 and is in axial alignment with the cases 40 and 50. The flexible membrane 10 is secured to the outer planar surface 62 of the washer plate 60 and spans the opening 64. A reflective coating, such as by way of example, silver is applied to either surface of the membrane 10. An outer plate 70 is adhesively secured to the membrane and overlaps the side wall 72 of the opening 64, for securing the membrane in place on the plate 60 and protecting the fragile membrane against inadvertent damage. The outer plate 70 includes a central through opening 74 which is concentric with the opening 64 in the plate 60. The lens 12 is adhesively secured directly to the surface 16 of the membrane 10, at the geometric center 14. Acoustic waves may be directed toward the membrane 10 through the opening 74 in the outer plate 70.

As is best shown in FIG. 3, a glass prism or cone 80 is mounted in the inner case 40 and is in axial alignment with the case and the geometric center 14 of the microphone. The truncated conical outer end 82 of the prism extends beyond the open end 54 of the inner case and into the cavity defined by the outer case 52. A pair of silicon chips 84 and 86 are mounted directly on the outer surface of the cone 82 and include elongate V-grooves extending in the direction of the fiber optic cables 20 and 22, respectively for carrying and directing the fiber optic cable on a path intersecting the optical axis of the lens 12. The fiber optic cables 20 and 22 are carried in the silicon chip brackets 84 and 86, respectively, and are disposed outside of the outer perimeter of the prism 80 along the inner wall of the casing 40, and through the aperture 46 in the end cap 42. The cable 20 is then directed to a remote detector 26, and the cable 22 is then connected to a remote light source 24, as previously described.

In the preferred embodiment of the invention, the cone 82 intersects the axis of the microphone at an angle of 45°, whereby the fiber optic cables 20 and 22 have included angles of 90°. The fiber optic cables each have an end point 90 and 92, respectively, which is placed away from the outer surface 94 of the lens 12, i.e. the cables never come in contact with the lens. The specific distance between the ends of the cables and the lens is fine-tuned for adjusting the modulation of the microphone.

A prototype fiber optic microphone made in accordance with the teachings of the subject invention was constructed utilizing a copper tube having an inner diameter of approximately 45 millimeters. The overall length of the prototype microphone from the end wall 44 to the outer plate 70 is approximately 160 millimeters. The glass prism 80 was mounted in axial alignment with the inner casing on a plastic plug which spanned the inner diameter of the inner casing. The silicon chips are glued to the sides of the cone of the prism with the fibers glued into the V-grooves in alignment with the optical axis of the lens 12. The lens is positioned in the geometric center of the membrane which is stretched and glued on the outer surface 62 of the plate 60.

In the prototype embodiment, the membrane was made from an orientated polyester and the opening in the plate 60 was a circular opening with a 0.750 inch internal diameter. The lens is made from an Epo-Tek 302-3 optically transparent epoxy manufactured Epoxy Technology Inc. and has an index of refraction of 1.543. The lens curvature has a radius of 0.871 millimeters. The fibers used in the prototype are Ensign-Bickford HCN-H0200T-14. These fibers are a hard clad silica fiber with a numerical aperture of 0.48. The fiber core is 200 microns in diameter, and the cladding is 230 microns. In the prototype, the end of each fiber optic cable is initially placed 1.1 millimeters from the surface 16 of the membrane, as measured along the axis of each fiber optic cable. The cables are fine-tuned to optimize the microphone response. The remote end of the fiber, utilized for connecting the fiber cables to the light source and detector, respectively, are SMA 905 type connectors for 230 micron fibers. The prototype light source is a Honeywell LED, Part No. HFE4855-0145 with an output rated at 1.6 MW into a 200 micron fiber. The detector is a Honeywell receiver, Part No. HFD 3862-002 with a responsivity of 4 millivolts per microwatt of incident light.

It will be readily understood that the epoxy lens provides a suitable, short focal length and is readily attachable to the thin, easily deflected membrane.

It will also be understood by those who are skilled in the art that the optical element and membrane could be constructed of a variety of materials, including but not limited to a lens of polymer materials formed in drops either from a melt or from solvent on a diaphragm membrane surface. There are various polymer materials used as optical materials that would make suitable lenses depending on the compatibility with the chosen membrane materials. The membranes may be of any polymeric as used in most microphones in use today but may also be metal foils or non-metal foils such as silicon, silicon carbide, silicon nitride or diamond. Molten glass or other high temperature material formed either from a melt or from another process such as a sol-gel process could be used to form lenses on membranes of sufficiently high temperature materials that will withstand thermal processing better than the polymeric material of the prototype embodiment.

Further, the optical element need not be a simple planar, convex element formed by a drop of material as in the prototype implementation. The element could readily be a biconvex, by putting a drop of epoxy on the membrane, adding a second lens and metalizing the back surface. The lens could also be placed on a diffraction grating surface other than the planar reflective surface of the preferred embodiment, creating a more complex optical surface. The specific embodiment chosen and configuration utilized will depend on the desired results.

The specific configuration of the optical element and the membrane is a matter of choice, as long as the element is easily secured to and will vibrate with the vibrating membrane, providing a vibrating optical element for use in connection with a fixed fiber optic cable for providing the fiber optic microphone of the subject invention. The epoxy method of creating a lens is particularly attractive because it permits the use of membrane materials similar to those currently used in electromechanical microphones and does not require any thermal treatment of the lens or the membrane. However, where cost and manufacturing processes are not a factor, the lens and membrane materials could be selected depending on the desired output characteristics of the microphone.

While certain features and embodiments of the invention have been described in detail herein, it will be readily understood that the invention includes all enhancements and modifications within the scope and spirit of the following claims.

What is claimed is:

1. A transducer for converting varying acoustic pressure wave into a signal comprising a light beam made up of variable components corresponding to the varying acoustic pressure wave, comprising:
   a. a support base having a through aperture;
   b. a flexible membrane covering the aperture, the membrane having an inner surface and an outer surface exposed to acoustic pressure wave, the membrane adapted to vibrate in response to the acoustic pressure waves being directed toward said outer surface;
   c. a beam altering optical element mounted directly on the inner surface of the flexible membrane for movement with the membrane and positioned at an optimum point relative to the membrane for intercepting the light beam, whereby the optical element vibrates with the membrane;
   d. first means positioned a first predetermined distance from a membrane for directing a beam of light toward the optical element, the optical element adapted to altering and redirecting the beam of light in varying form in response to the vibration of the membrane for receiving the altered and redirected beam of light;
   e. second means positioned a second predetermined distance from the membrane; and
   f. a fiber optic cable in communication with each of said first and second means and terminating at a position spaced a third predetermined distance from the optical element for transmitting the beam of light to and from the optical element.

2. The transducer of claim 1, wherein said optical element is refractive.

3. The transducer of claim 1, wherein said optical element is diffractive.

4. The transducer of claim 1, wherein said optical element is mounted at the point of maximum vibration of the membrane.

5. The transducer of claim 4, wherein said optical element is mounted at the geometric center of the membrane.

6. The transducer of claim 1, wherein said optical element includes an optical axis and wherein said beam of light intersects the optical axis.

7. The transducer of claim 1, wherein said means for directing the beam of light comprising a light emitting diode.

8. The transducer of claim 1, wherein said means for receiving the redirected beam of light comprises a detector adapted for receiving the light beam and converting it into corresponding electrical signals.

9. The transducer of claim 1, further comprising a signal splitter disposed between both said first and second means and said optical element, wherein each of said means is in communication with the said splitter, and the fiber optic cable is in communication with said splitter for transmitting both the beam of light and the altered, redirected beam of light between the splitter and the optical element.

10. The transducer of claim 1, further including a reflective finish on the inner surface of said membrane.

11. The transducer of claim 1, wherein said optical element is a liquid optical epoxy dropped onto and cured in place on said membrane.

12. A fiber optic microphone for receiving acoustic pressure waves and converting the acoustic pressure waves into a varying light beam, comprising:
   a. a cylindrical sleeve defining a microphone case having opposite open ends;
   b. a closure cap on one end of the microphone case, the having a through aperture;
   c. a diaphragm plate on the other end of the microphone case and having a circular, through, diaphragm aperture of a predetermined size;
   d. a flexible membrane having an inner surface and an outer surface and secured to said plate and stretched over and covering said diaphragm aperture and covering said diaphragm aperture for defining a diaphragm adapted to vibrate in response to acoustic waves directed toward the outer surface thereof;
   e. a beam altering lens mounted directly on the inner surface of the membrane in the position of maximum vibration of the membrane;
   f. first means for directing a beam of light toward the lens, the lens adapted for redirecting the beam of light in varying form in response to vibration of the membrane;
   g. second means for receiving the redirected beam of light; and
   h. a fiber optic cable in communication with each of said first and second means and terminating at a position spaced a predetermined distance from the lens for transmitting the beam of light to and from the lens.

13. The microphone of claim 8, wherein said means for directing the beam of light and said means for receiving the redirected beam of light are positioned outside the microphone case.

14. The microphone of claim 12, wherein said means for directing the beam of light comprises a light emitting diode.

15. The microphone of claim 12, wherein said means for receiving the redirected beam of light comprises a detector adapted for receiving the redirected beam of light and converting it into corresponding electrical signals.

16. The microphone of claim 12, wherein said membrane comprises an orientated polyester material.

17. The microphone of claim 12, further including a reflective coating applied to the inner surface of said membrane.

18. The microphone of claim 12, wherein said lens is a liquid optical epoxy dropped onto and cured in place on the inner surface of said membrane.

19. The microphone of claim 18, wherein said epoxy comprises an optically transparent polymeric material.

20. The microphone of claim 12, further comprising a holder made of a material mounted in said case, the holder having a truncated conical end in axial alignment with the lens and the membrane, a pair of elongated fiber optic cables having opposite ends, the cables carried by said holder and mounted on said truncated conical end with one of each of said cables extending beyond said truncated conical end to a predetermined position spaced from said lens.

21. The microphone of claim 20, wherein the opposite end of each of said cables extends through the aperture in said closure cap and is in communication with one of said means, respectively.

22. The microphone of claim 20, further including a pair of guides mounted on said truncated conical end and adapted for receiving an aligning said cables with said lens.

23. The microphone of claim 22, wherein said guides are constructed of glass.

24. The microphone of claim 20, wherein said holder is constructed of glass.

25. A fiber optic microphone for receiving acoustic pressure waves and converting the acoustic pressure waves into a varying light beam, comprising:
   a. a cylindrical sleeve defining a microphone case having opposite open ends;
   b. a closure cap on one end of the microphone case, the cap having a through aperture;
   c. a diaphragm plate on the other end of the microphone case and having a circular through diaphragm aperture of a predetermined size;
   d. a flexible membrane having an inner surface and an outer surface and secured to said plate and stretched over and covering said diaphragm aperture therein for defining a diaphragm adapted to vibrate in response to acoustic waves directed toward the outer surface thereof;
   e. a beam altering lens mounted on the inner surface of the membrane in the position of maximum vibration of the membrane;
   f. first means outside the sleeve for directing a beam of light toward the lens, the lens adapted for altering and redirecting the beam of light in varying forms in response to the vibration of the membrane;
   g. second means outside the sleeve for receiving the altered, redirected beam of light;
   h. a holder mounted in said case, the holder having a truncated conical end in axial alignment with the lens in the membrane; and
   i. a pair of elongated fiber optic cables having opposite ends, the cables carried by said holder and mounted on said truncated conical end with one end of each of said cables extending beyond said truncated conical end to a predetermined position spaced from said lens.

26. The microphone of claim 25, further including a pair of guides mounted on said truncated conical end and adapted for receiving and aligning said cables with said lens.

27. The microphone of claim 25, wherein the opposite end of each of said cables extends through the aperture in said closure cap and is in communication with said first and second means, respectively.

* * * * *